United States Patent
Peacock et al.

(10) Patent No.: US 7,386,858 B1
(45) Date of Patent: *Jun. 10, 2008

(54) METHOD AND APPARATUS FOR UNIFIED EXTERNAL AND INTERPROCESS COMMUNICATION

(75) Inventors: Gavin Peacock, Pleasant Hill, CA (US); Jeffrey C. Hawkins, Redwood City, CA (US)

(73) Assignee: Access Systems Americas, Inc., Sunnyvale, CA (US)

( * ) Notice: Subject to any disclaimer, the term of this patent is extended or adjusted under 35 U.S.C. 154(b) by 869 days.

This patent is subject to a terminal disclaimer.

(21) Appl. No.: 10/622,880

(22) Filed: Jul. 18, 2003

Related U.S. Application Data

(63) Continuation of application No. 09/113,452, filed on Jul. 10, 1998, now Pat. No. 6,601,111, which is a continuation-in-part of application No. 08/790,518, filed on Jan. 29, 1997, now Pat. No. 5,900,875.

(51) Int. Cl.
*G06F 3/01* (2006.01)
*G06F 15/16* (2006.01)
*G06F 9/46* (2006.01)

(52) U.S. Cl. ..................... 719/314; 709/225
(58) Field of Classification Search ............... 719/314; 370/412–418; 709/225
See application file for complete search history.

(56) References Cited

U.S. PATENT DOCUMENTS

| | | | |
|---|---|---|---|
| 3,744,034 A | 7/1973 | Paul | |
| 5,218,704 A | 6/1993 | Watts, Jr. et al. | |
| 5,235,679 A | 8/1993 | Yoshizawa et al. | |
| 5,396,630 A | 3/1995 | Banda et al. | |
| 5,475,847 A | 12/1995 | Ikeda | |
| 5,488,685 A | 1/1996 | Palmer et al. | |
| 5,557,288 A | 9/1996 | Kato et al. | |
| 5,557,798 A | 9/1996 | Skeen et al. | |
| 5,587,724 A | 12/1996 | Matsuda | |
| 5,602,997 A | 2/1997 | Carpenter et al. | |
| 5,630,148 A | 5/1997 | Norris | |
| 5,650,001 A | 7/1997 | Howell | |
| 5,661,632 A | 8/1997 | Register | |
| 5,673,322 A | 9/1997 | Pepe et al. | |
| 5,703,581 A | 12/1997 | Matias et al. | |
| 5,704,029 A | 12/1997 | Wright, Jr. | |
| 5,737,690 A * | 4/1998 | Gutman | 340/7.54 |

(Continued)

OTHER PUBLICATIONS

Stevens, W. Richard. TCP/IP Illustrated, vol. I: The Protocols. Addison-Wesley Publishing Company, Inc., 1994.*

(Continued)

*Primary Examiner*—William Thomson
*Assistant Examiner*—Richard Pantoliano, Jr.
(74) *Attorney, Agent, or Firm*—Hickman Palermo Truong & Becker LLP

(57) ABSTRACT

A palmtop computer system that incorporates mechanical buttons that combine the task of turning the palmtop computer system on and starting a particular application program. Furthermore, the same mechanical button can be used to navigate the application program to find the information that is most likely needed by the user. Additionally, external devices can be coupled to the palmtop computer system in a manner that allows the external hardware device to initiate specific application programs that cooperate with the external hardware device.

8 Claims, 13 Drawing Sheets

U.S. PATENT DOCUMENTS

| | | | |
|---|---|---|---|
| 5,745,056 | A | 4/1998 | Takahashi et al. |
| 5,796,404 | A | 8/1998 | Gentner |
| 5,802,312 | A * | 9/1998 | Lazaridis et al. ............ 709/238 |
| 5,815,820 | A | 9/1998 | Kiem et al. |
| 5,825,353 | A | 10/1998 | Will |
| 5,854,624 | A | 12/1998 | Grant |
| 5,864,862 | A | 1/1999 | Kriens et al. |
| 5,900,875 | A | 5/1999 | Haitani et al. |
| 5,907,801 | A | 5/1999 | Albert et al. |
| 5,911,141 | A | 6/1999 | Kelley et al. |
| 5,918,013 | A | 6/1999 | Mighdoll et al. |
| 5,966,125 | A | 10/1999 | Johnson |
| 5,973,645 | A | 10/1999 | Zigler et al. |
| 5,974,238 | A * | 10/1999 | Chase, Jr. .................... 709/248 |
| 6,000,000 | A * | 12/1999 | Hawkins et al. ............ 707/201 |
| 6,049,328 | A | 4/2000 | Vanderheiden |
| 6,115,384 | A | 9/2000 | Parzych |

OTHER PUBLICATIONS

Umar, Amjad. Object-Oriented Client/Server Internet Environments. Prentice-Hall, Inc., 1997.*

Kramer, M., et al., "Use of Two-Way Wireless Messaging for Personal Telephone Management", IEEE, 1993, pp. 743-748.

Gray, R. "Efficient MC68HC08 Programming: . . . ," Dr. Dobb's Journal, V20, n5, p. 70(5), 1995.

Ruley, J., "Handheld-to-handheld Combat," Windows Magazine, 1997, n811, p. 55.

Forbes, J., et al., "Palm PCs get a Big Hand," Windows Magazine, 1998, n905, p. 96.

Bursky, D., "Evolving DSP chips to more," Electronic Design, v38, n23, p. 51(8), 1990.

Fiegel, C.P., "IBM, Motorola Preview embedded PowerPCs; . . . ," Microprocessor Report, v8, n6, p. 1(5).

Penwarden, M., "More muscle for HP's Omnibook," Window Magazine, 1994, n 501, p. 110.

Mastering MicroSoft Office 97 Professional Edition (Sybex, Inc.) 1996.

Eric A. Bier, "Embedded Buttons: Documents as User Interfaces" UIST '91 Proceedings, 1991.

Allan MacLean, et al. "User-Tailorable Systems: Pressing the Issues with Buttons" CHI '90 Proceedings, Apr. 1990.

Jim Louderback, "Zoomer doesn't zoom, but for some users this PDA makes sense" PC Week v10, n 42, Oct. 25, 1993.

Isamu Iwai, et al., "User Interface Development Tools for Pen Computer Applications" Human-Computer Interaction: Software and Hardware Interfaces Proceedings of HCI International '93, Aug. 1993, p. 1016-1021.

George W. Fitzmaurice, et al., "Virtual Reality for Palmtop Computers" ACM Transactions on Information Systems, vol. 11, No. 3, Jul. 1993, p. 197-218.

* cited by examiner

METHOD AND APPARATUS FOR UNIFIED EXTERNAL AND INTERPROCESS COMMUNICATION

RELATED APPLICATION

This application is a continuation of U.S. patent application Ser. No. 09/113,452, entitled "Method and Apparatus for Unified External and Interprocess Communication", filed by Gavin Peacock, et al. on Jul. 10, 1998, now U.S. Pat. No. 6,601,111, which is a continuation-in-part of U.S. application Ser. No. 08/790,518, entitled "Method and Apparatus for Interacting With a Portable Computer System", filed by Robert Yuji Haitani, et al. on Jan. 29, 1997, now U.S. Pat. No. 5,900,875. This application claims priority to and benefit of each of the previously filed patent applications identified in this paragraph, which are hereby incorporated by reference.

FIELD OF THE INVENTION

The present invention relates to the field of computer operating systems software. In particular the present invention discloses a method of providing an immediate response computer communication system for both external and internal interprocess communication.

BACKGROUND OF THE INVENTION

Modern computer operating systems support several application programs executing concurrently. To communicate with external hardware devices, the application programs call input/output routines in the operating system. To facilitate communication between applications, an operating system may provide a message passing system or a method of opening "sockets" between applications.

However, using two different methods for communicating information is unnecessarily complex. It would be desirable to have a simplified method of communicating information from and to application programs. Furthermore, it would be desirable to have a messaging system that allows dormant applications to be immediately activated upon receiving information that is destined for the dormant application.

SUMMARY OF THE INVENTION

It is an object of the present invention to implement a handheld computer system that allows a user to quickly turn on the handheld computer system and access the needed information. It is a further object of the present invention to allow the user to execute specific programs on the palmtop computer system using external devices coupled to the palmtop computer system.

These and other objectives are accomplished by the handheld computer system of the present invention which incorporates mechanical buttons that combine the task of turning the handheld computer system on and starting a particular application program. Furthermore, the same mechanical button can be used to navigate the application program to find the information that is most likely needed by the user. Additionally, external devices can be coupled to the palmtop computer system in a manner that allows the external hardware device to initiate specific application programs that cooperate with the external hardware device.

BRIEF DESCRIPTION OF THE DRAWINGS

The objects, features and advantages of the present invention will be apparent to one skilled in the art, in view of the following detailed description in which:

FIG. 10a illustrates a screen display for an addressbook application program that divides records using multi-function categories.

FIG. 10b illustrates a screen display for an addressbook application program that is displaying a pop-up menu with the multi-function categories.

FIG. 10c illustrates a screen display for an addressbook application program that is displaying a set of records under the "business" multi-function category.

DETAILED DESCRIPTION OF THE PREFERRED EMBODIMENT

A method and apparatus for providing an immediate response computer communication system that provides both external and interprocess communication is disclosed. In the following description, for purposes of explanation, specific nomenclature is set forth to provide a thorough understanding of the present invention. However, it will be apparent to one skilled in the art that these specific details are not required in order to practice the present invention. For example, the present invention has been described with reference to an exchange manager in a mobile computer system. However, the same techniques can easily be applied to other types of computer devices.

Operating System Architecture

Figure 1:
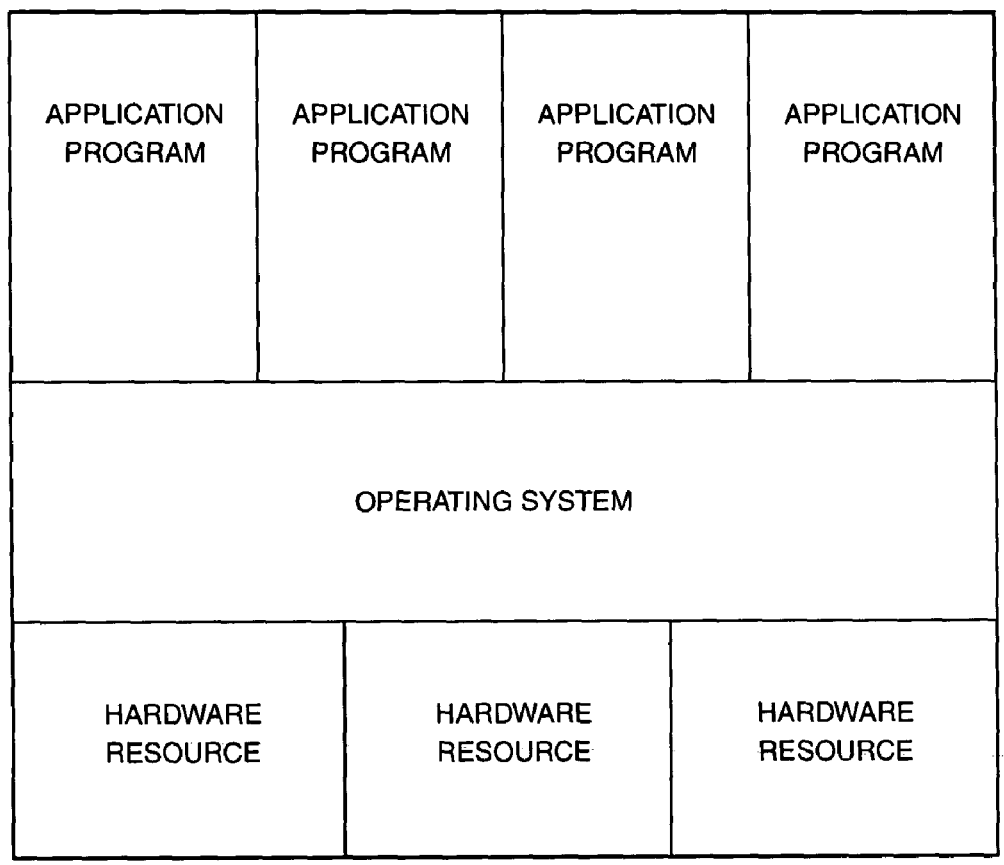
FIG. 1 illustrates a conceptual diagram of a typical computer operating system.

An operating system is a computer program that provides a consistent high level interface between computer application programs and computer hardware. FIG. 1 illustrates a conceptual diagram of a computer system. Referring to FIG. 1, the operating system is positioned between application programs and the computer hardware. Thus, the operating system controls all the computer hardware directly.

To access computer hardware features, application programs must communicate with the operating system by making system calls. For example, if an application program wishes to communicate externally using a serial port, the application program must make a system call into the operating system requesting the serial port communication. The operating system directly communicates with the serial port and performs the serial port communication desired by the application program.

In modern operating systems, the operating system shares the computer hardware resources among several concurrently executing application programs. Thus, the operating system arbitrates requests for the same hardware feature from more than one application program.

Besides handling communication with computer hardware, modern operating systems must provide a method of allowing different application programs to communication with each other. Such a feature is referred to as "interprocess" communication.

An "In-Box" Approach

One method of providing an interprocess and external communication system would be to provide an operating system messaging subsystem, an "In-Box", that handles messaging. The In-Box would accept interprocess and external messages for applications that are not currently executing and store such messages for later delivery. Active applications that accept interprocess and external messages would be notified when they have received a message. Alternatively, active applications could periodically poll the In-Box determine if a message has been received. When a message is received for an application, that application would then be responsible for collecting the message from the In-Box.

Such an In-Box system requires the applications to proactively collect messages from the In-Box. Thus, the user would not have any immediate feedback when messages are received. The user would need to activate the application such that the application would fetch received messages from the In-Box program. A more immediate message delivery system would be desirable.

Unified Exchange Manager Architecture

The present invention introduces an improved operating system construct that allows application programs to immediately communicate with external communication hardware and communication with other application programs using a single consistent interface. The operating system subsystem that provides this functionality is known as the "Exchange Manager." The Exchange Manager provides immediate user feedback by immediately activating applications that have received messages. Furthermore, the Exchange Manager is extensible such that it allows new communication libraries to be added thereby allowing the Exchange Manager to adopt new communication technologies that emerge.

Figure 2:
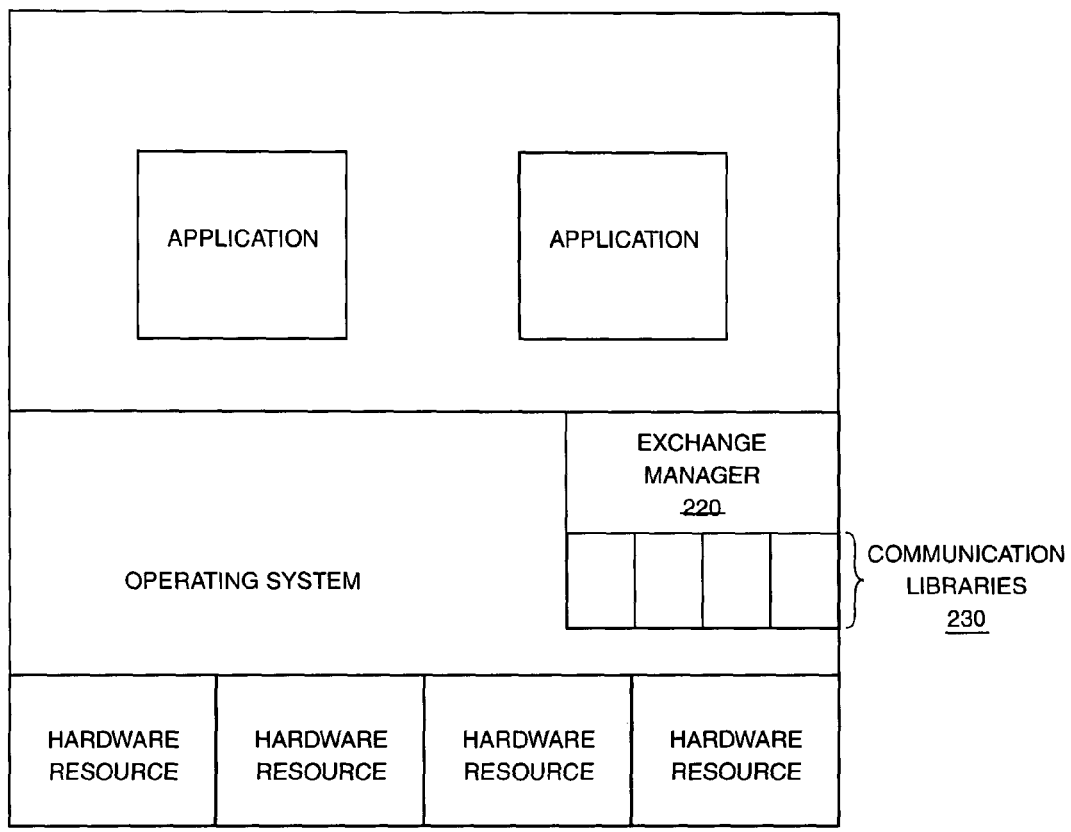
FIG. 2 illustrates a conceptual diagram of an operating system built according to the teachings of the present invention.

FIG. 2 illustrates a conceptual diagram of computer system that includes an Exchange Manager 220 subsystem in the operating system. Referring to FIG. 2, all communication between the application programs and external communication hardware is performed through the Exchange Manager 220.

To handle communication details for different protocols and different media, the Exchange Manager 220 transacts with a set of communication libraries 230. The communication libraries 230 implement protocol stacks and handle the communication with the device drivers associated with individual communication devices.

A serial TCP/IP communication library is one example of a communication library. The serial TCP/IP communication library may implement the Transport Communication Protocol/Internet Protocol (TCP/IP) stack and the Point-to-Point Protocol (PPP) stack for Internet communication. The serial TCP/IP communication library would communicate with a serial port driver to send and receive data from the computer system.

Figure 3:
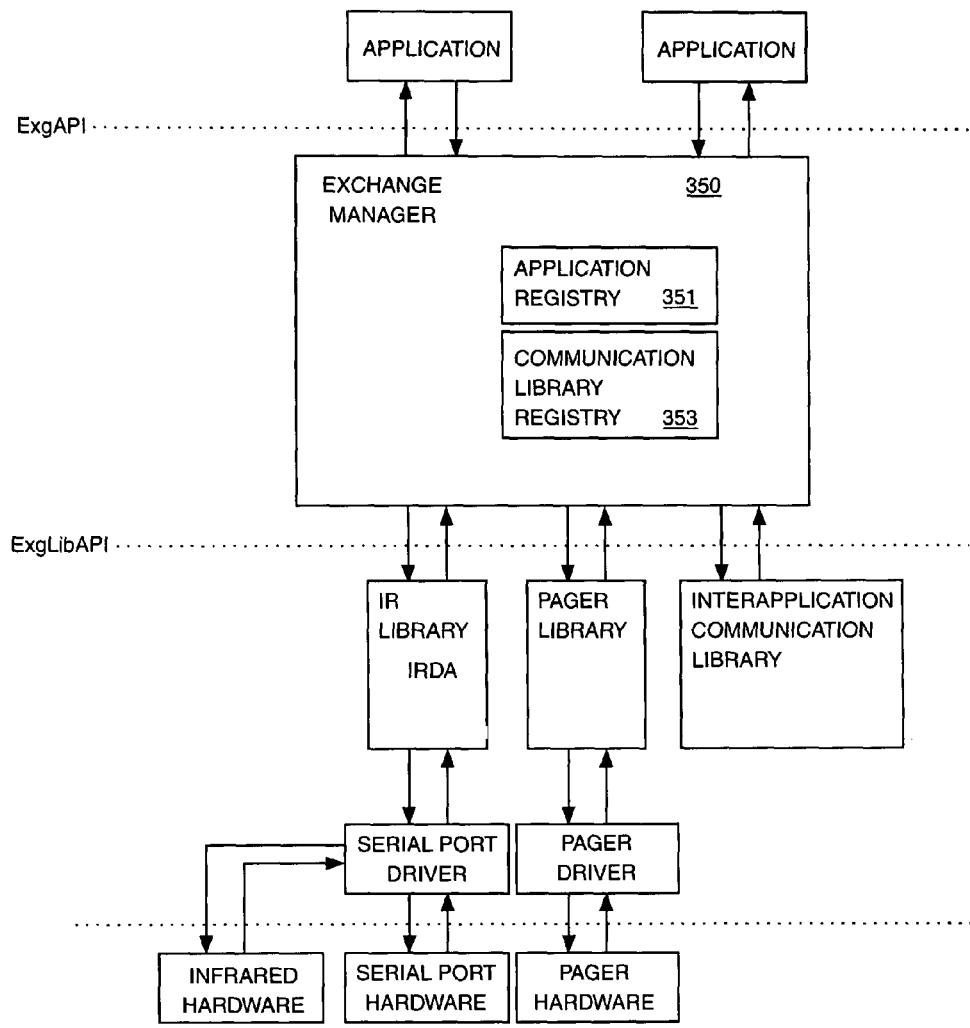
FIG. 3 illustrates a conceptual diagram of the Exchange Manager Architecture.

FIG. 3 illustrates a more detailed conceptual diagram of the Exchange Manager Architecture. As illustrated in FIG. 3, another example of a communication library is an Infrared Communication library. The Infrared Communication library may use a serial device driver to communicate with an infrared device. An example of the serial port driver that may be used is described in the co-pending U.S. patent application entitled "Method and Apparatus for Serial Port Sharing" with Ser. No. 09/078,357 filed on May 13, 1998.

It is important to note that the Exchange Manager is always available for operation. In one embodiment, the Exchange Manager resides in memory that is always available to the processor. Thus, the features of the Exchange Manager are available any time that the computer system receives a message from an external source.

Referring to FIG. 3, the application programs communicate with the Exchange Manager 350 through an exchange application programming interface (ExgAPI). Each application program that is capable of accepting messages registers with the exchange manager. When an application registers with the Exchange Manager, the Exchange Manager stores information about the application in an application registry 351.

Exchange Manager Application Registry

The application registration procedure provides the information that allows the Exchange Manager to receive information for the application and notify the application when information has been received. To identity incoming data, the Exchange manager needs to know about the types of data that a program will accept. In one embodiment, this is performed by having the application programs provide the following pieces of information to the Exchange Manager: a creator identification (creatorID), a MIME data type, and an file extension. The application registration procedure is also used to provide the Exchange Manager with a set program entry points that will be used by the Exchange manager when the Exchange manager receives a message for that application program.

In the embodiment that uses the creatorID parameter, the creatorID is used to uniquely identify a particular application program. In one embodiment, the creatorID is value that is registered with the operating system manufacturer and is defined to uniquely identify one particular program.

The MIME type identifies a particular Multipurpose Internet Mail Extension (MIME) type of data that the program is designed to handle. Detailed information about the MIME types can be found at the Internet Mail Consortium's web site at http://www.imc.org/ In the present invention, application programs identify the MIME types that they can handle. If more than one application supports a particular MIME type, then the user may select a default application that will be used to accept messages of that MIME type.

The file extension describes a three letter filename extension that defines a type of information that the application handles. The three letter extension is a legacy of the Microsoft DOS and Windows 3.1 operating systems. For example, the three letter extension "JPG" refers to JPEG image files and the three letter "DOC" extension refers to Microsoft Word files.

Each application that can receive messages also provides a few entry point vectors to the Exchange Manager. A first entry point vector provides a routine that should be called when the Exchange Manager begins receiving a message for a particular application. A second entry point vector provides a routine that should be called after receiving a full message for a particular application program. The operation of these entry point vectors will be describe in more greater detail in a later section.

Communication Libraries

Referring back to FIG. 3, the Exchange Manager 350 communicates with various communication libraries through an Exchange Library Application programming interface (ExgLibAPI). The communication libraries are software modules designed to handle different types of communication systems. New communication libraries may be added to handle new communication protocols and new communication media. When a new communication library is added, the Exchange Manager 350 stores information about the new communication library in a communication library registry 353.

In the example of FIG. 3, there are three communication libraries: an Infrared (IR) communication library, a Pager communication library and an Interapplication communication library. Each communication library handles a different medium.

The IR communication library allows the portable computer to communicate with the outside world using an infrared port.

The Pager Library allows the portable computer system to receive information from the outside world using pager communication hardware. Thus, a mobile computer system could receive alphanumeric messages from a paging network.

The Interapplication communication library allows various applications on the portable computer system to communicate with each other. Specifically, applications send messages to the interapplication communication library to pass interprocess messages. The Interapplication communication library routes all information it receives back up through the exchange manager to the recipient application. Thus, the interapplication communication library does not communicate with any external hardware. It should be noted that by implementing interprocess communication using an Interapplication communication library, both external and interapplication communication are performed using a single information exchange interface, the exchange application programming interface (ExgAPI).

To fully explain the workings of a typical communication library, the Infrared communication library will be examined in greater detail. The IR communication library allows the portable computer to communicate with the outside world using an infrared data port. In one embodiment, a special serial driver is used to control access to the infrared data port. Information about the serial driver can be found in the co-pending U.S. patent application entitled "Method and Apparatus for Serial Port Sharing" with Ser. No. 09/078,357 filed on May 13, 1998 which is hereby incorporated by reference. The IR communication library implements portions of the IrDA infrared standards to communicate using infrared light. The IrDA infrared standards define standards for infrared hardware, infrared software, and infrared communication protocol. Detailed information about the IrDA standards can be found at the Infrared Data Association's web site located at http://www.irda.org/.

In one embodiment, the IR communication library implements the IrDA protocol suite including the Specifications for Infrared Mobile Communications (IrMC) and the IrDA Object Exchange Protocol (IrOBEX). The IrDA Object Exchange Protocol (IrOBEX) allows the mobile computer system to "squirt" (send) and "slurp" (receive) various types of know data objects such as virtual business cards (vCards) and calendar entries. However, other types of object exchange systems may be used.

Unified Exchange Manager

The Exchange Manager provides a simple standardized interface to applications what wish to receive messages from external sources or other applications. To best disclose how the Exchange Manager interacts with applications, control flow examples are provided.

Exchange Manager Example Using Default Pop-Up Verification

Figure 4:
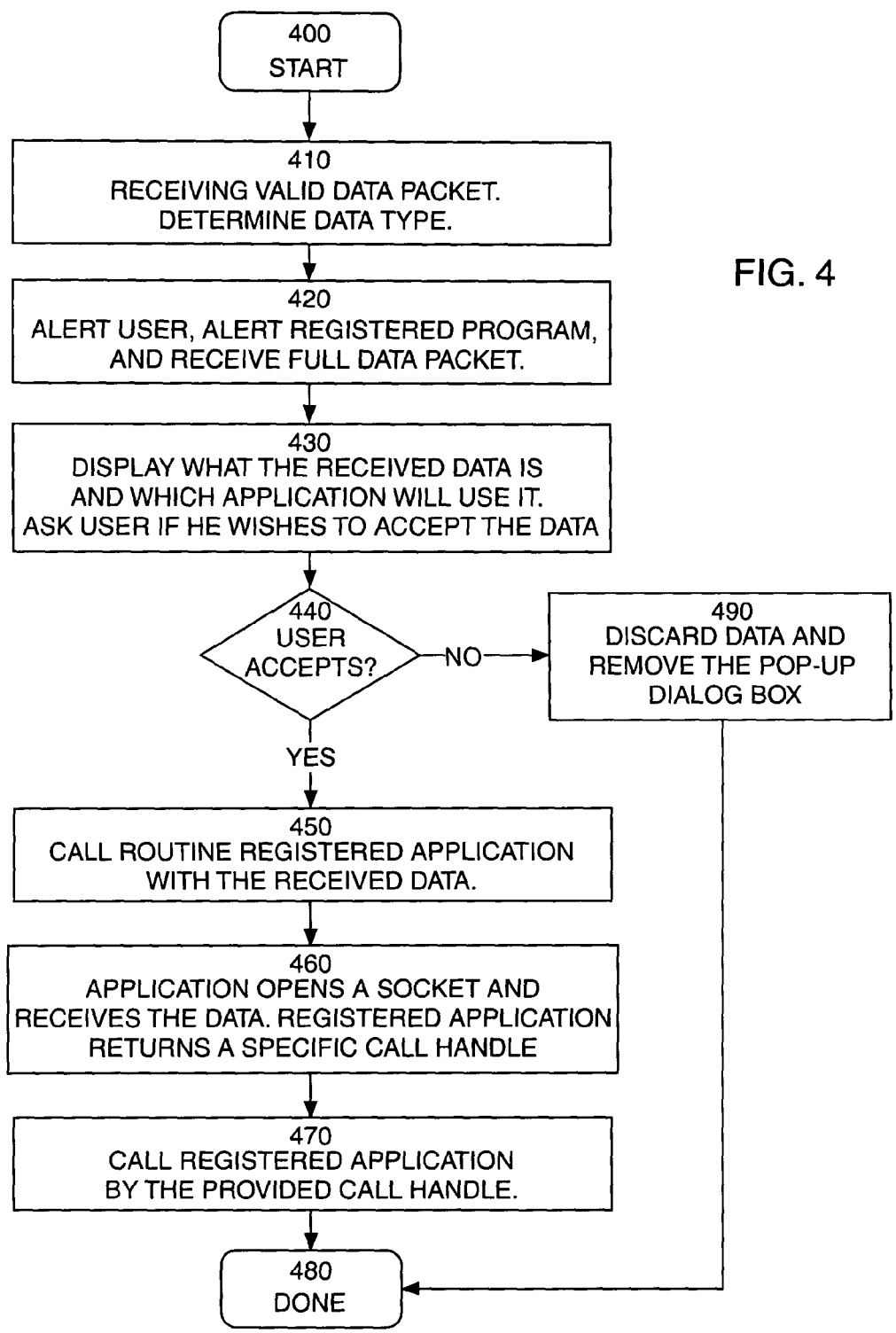
FIG. 4 illustrates a flow diagram that describes how the Exchange Manager operates when the default accept/reject dialogue is used.

FIG. 4 illustrates a flow diagram that describes one example of how the Exchange manager may operate when it receives an incoming message. The example of FIG. 4 discloses an example where a default accept/reject dialog box is present to the user. However, it should be noted that other methods of interacting with the Exchange manager may be occur.

Referring to step 410, the Exchange manager begins receiving data from one of the communication libraries. The Exchange manager examines the data packet headers in order to determine a what kind of data is being received. The data may be described with a MIME type, a creatorID, or a filename suffix. The Exchange Manager extracts a MIME type, a creatorID, or a filename suffix from the incoming data to determine a data type.

Next, at step 420, the Exchange Manager alerts the user that data is being received. This can be accomplished by presenting a pop-up dialog box. The Exchange manager then examines the Application Registry 351 to locate an application program that handles the incoming data type. If no matching application is found, then the Exchange Manager may simply discard the data. Alternatively, the Exchange Manager may ask the user if he wishes to save the data for later use.

When a matching application is found, the Exchange Manager makes a call into a callback routine that the application provided when it registered with the Exchange Manager. The callback routine is used to alert the application about the incoming data for that application. If more than one application has registered to receive the particular data type, then a default application will be used.

The application may respond in the callback routine in number of ways. The application may simply reject the data such that the Exchange Manager discards the incoming data. The application may simply accept the data. However, in one embodiment of the present invention, a default response is to allow the Exchange Manager to ask the user if he wishes to accept the information. This example will assume that the application elects to have the pop-up accept/reject dialogue box presented to the user. The Exchange Manager continues receiving data until the entire data packet is received.

At step 430, the Exchange Manager displays a dialogue box that describes the incoming data and specifies which application will be using the incoming data. If there is more than one application that has registered to receive that type of data, a list of applications may be displayed wherein the user may select which application will receive the data or whether the user will reject the data. The user is asked whether he wishes to accept the received data or reject the data. The user inputs a decision at step 440. If the user rejects the data, then the data is discarded and the pop-up dialogue box is dismissed as stated in step 490.

If the user elects to accept the data at step 440, then the Exchange Manager clears the pop-up dialogue box and calls a second callback routine into the application designated to receive the data at step 450. The second callback routine is a routine that fully handles incoming data. When the second callback routine is called, the Exchange Manager provides the received data packet or a pointer to the received data packet such that the application can process the received data packet.

At step 460, the callback routine processes the received data packet. In one embodiment, the application's callback routine opens up a socket to the Exchange Manager and accepts the data from the Exchange Manager. In another embodiment, the application's callback routine copies the data that is pointed to by a data pointer. When the application's callback routine is done processing the data, the application's callback routine returns a call handle vector that may be used to open the application and access the newly received data.

At step 470, the Exchange Manager calls the call handle provided by the application's callback routine. The call handle provided by the callback routine activates the application and, ideally, brings the application into a state where the newly received data is received. Thus, when a user receives information and accepts the information, the application that received the new information immediately displays the information to the user.

Exchange Manager Example Using Customized Acceptance or Denial

Figure 5:
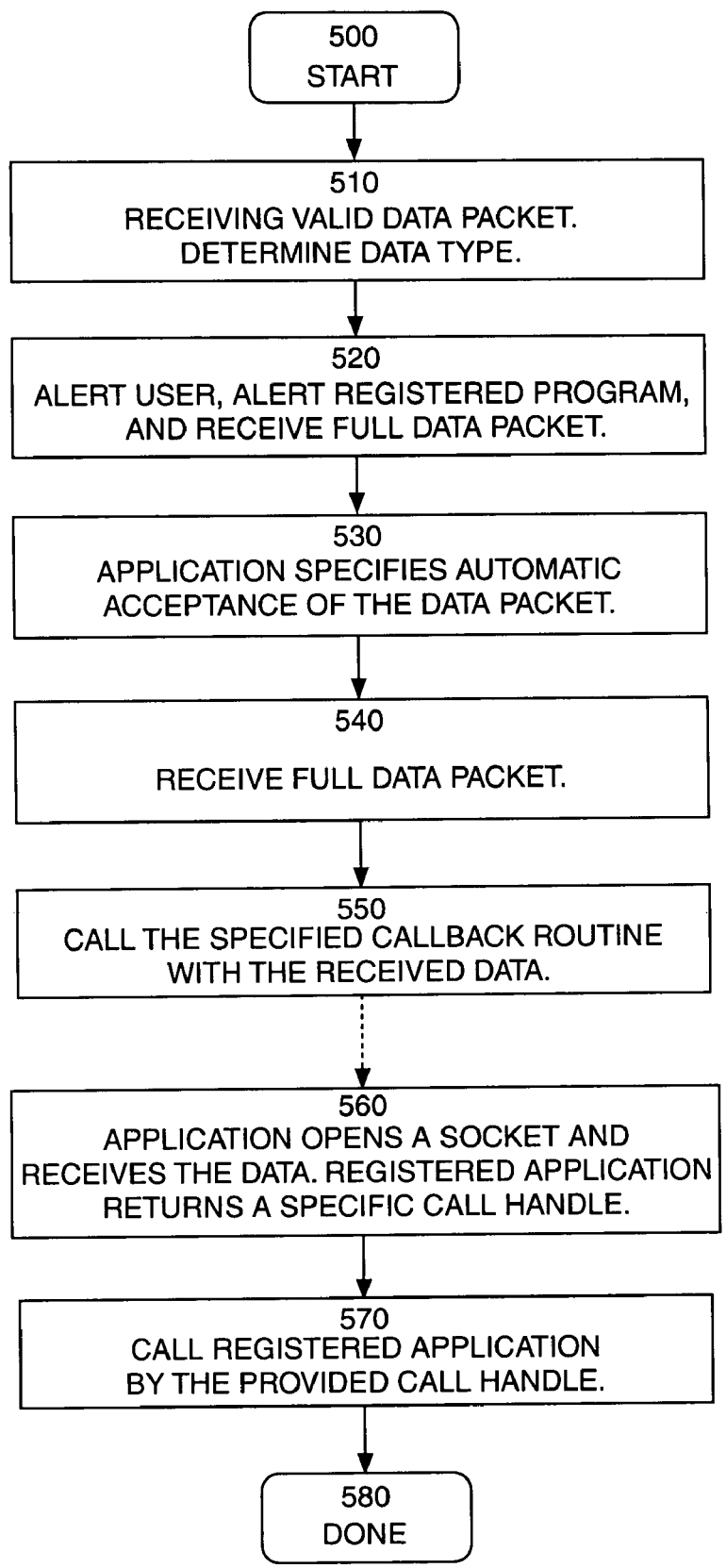
FIG. 5 illustrates a flow diagram that describes how the Exchange Manager operates when the default accept/reject dialogue is not used.

As previously set forth, an application that accept data packets from the Exchange manager do not have to use the default accept/reject mechanism. FIG. 5 provides a flow diagram that describes the operation of an application that does not use the default accept/reject dialogue.

Referring to step 510, the Exchange manager begins receiving data from one of the communication libraries and examines the data packet headers in order to determine a what kind of data is being received. Next, at step 520, the Exchange Manager makes a call into the data alert callback routine that the application provided when it registered with the Exchange Manager. In this example, the callback routine informs the Exchange Manager that the application program will accept the incoming data packet at step 530. However, the application could have rejected the data packet.

The Exchange Manager receives the full data packet at step 540. Next, the Exchange Manager calls a second callback routine into the application designated to receive the data at step 550. Within the callback routine at step 660, the callback routine accepts and processes the received data packet. The callback routine returns a call handle that will be used to activate the application program. At step 570, the Exchange Manager calls the call handle provided by the application's second callback routine. The call handle provided by the callback routine activates the application and brings the application into a state where the newly received data is received. Thus, an application can receive information and immediately display the newly received information without any input from the user.

Infrared Business Card Exchange Example

To best illustrate the features of the present invention, a practical example of use in a mobile computing system is provided. The practical example involves the exchange of an electronic business card from a first mobile computing device to a second mobile computing device.

Figure 6:
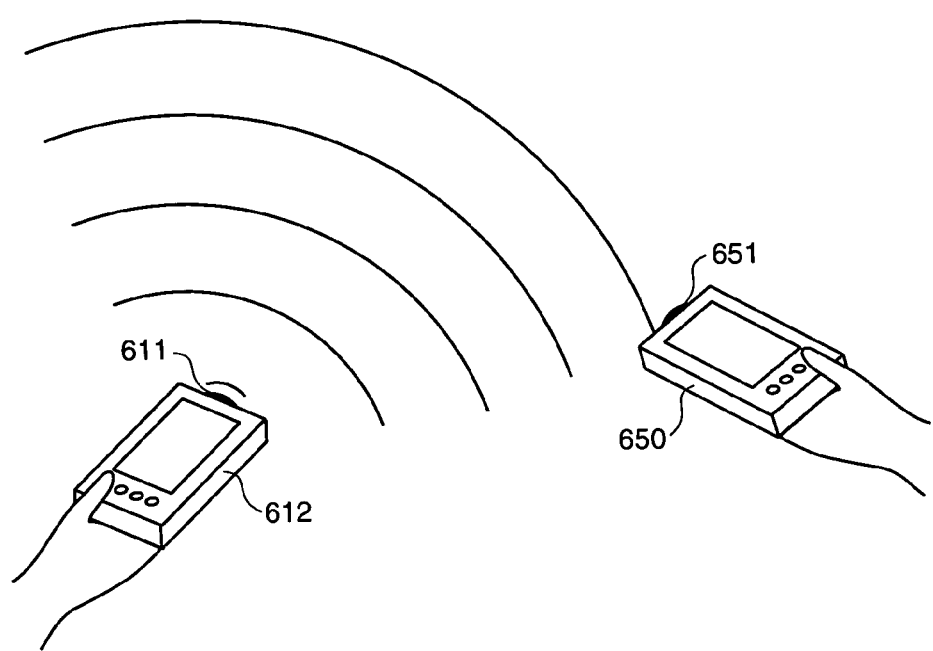
FIG. 6 illustrates two mobile computing devices that wish to transfer electronic business cards using an infrared link.

FIG. 6 illustrates two mobile computing devices 610 and 650. Each mobile computing device has a corresponding infrared transceiver 611 and 651 that can transmit and receive infrared data signals. To simplify the sharing of personal information, the present invention provides the architectural framework whereby one of the mobile computing devices can immediately transmit an electronic business card to the other mobile computing device. The present invention also provides the architectural framework whereby the receiving mobile computing device may immediately accept and use the received electronic business card.

Figure 7:
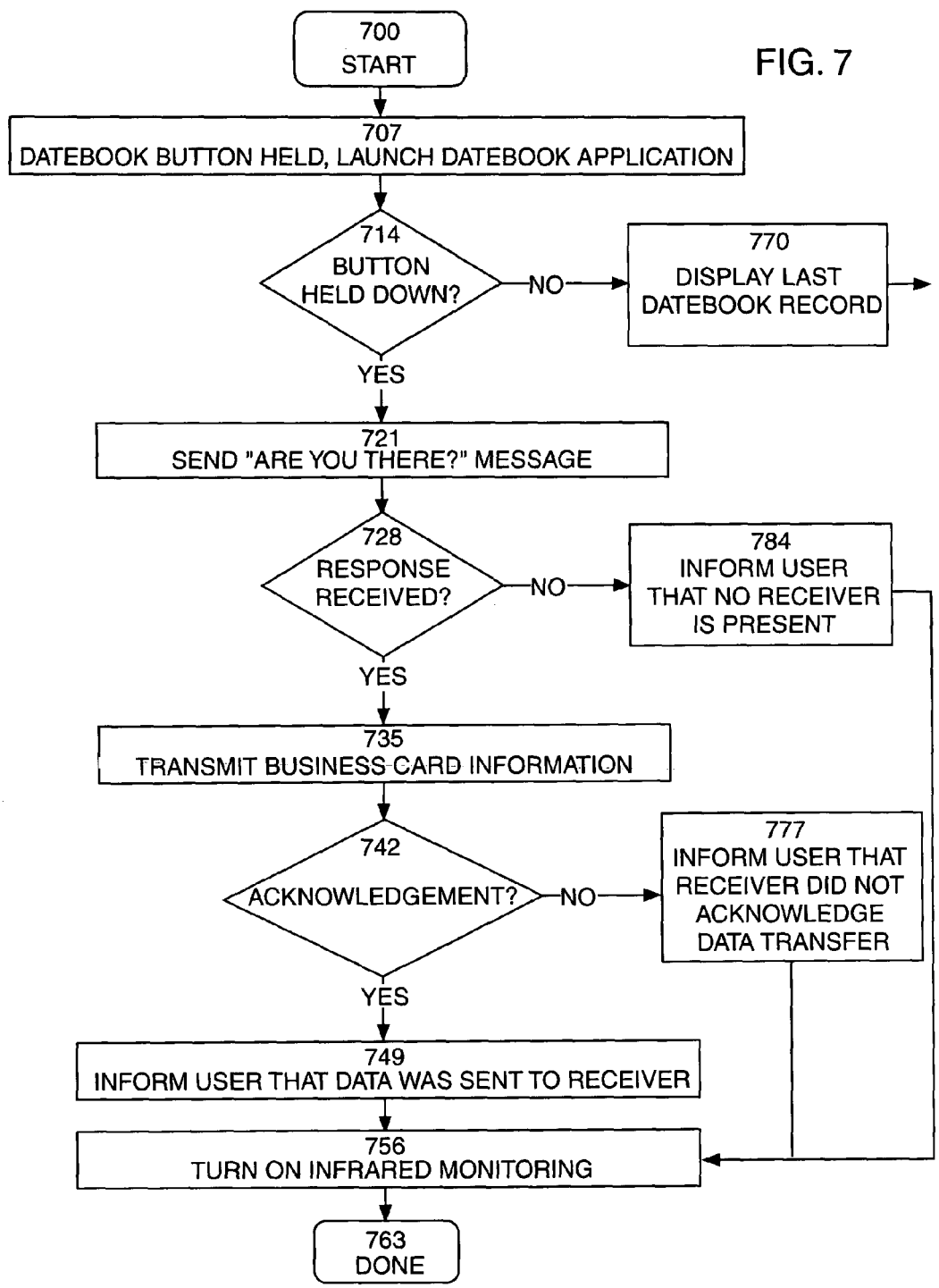
FIG. 7 illustrates a flow diagram that describes how a mobile computing device may transmit an electronic business card.
Figure 8:
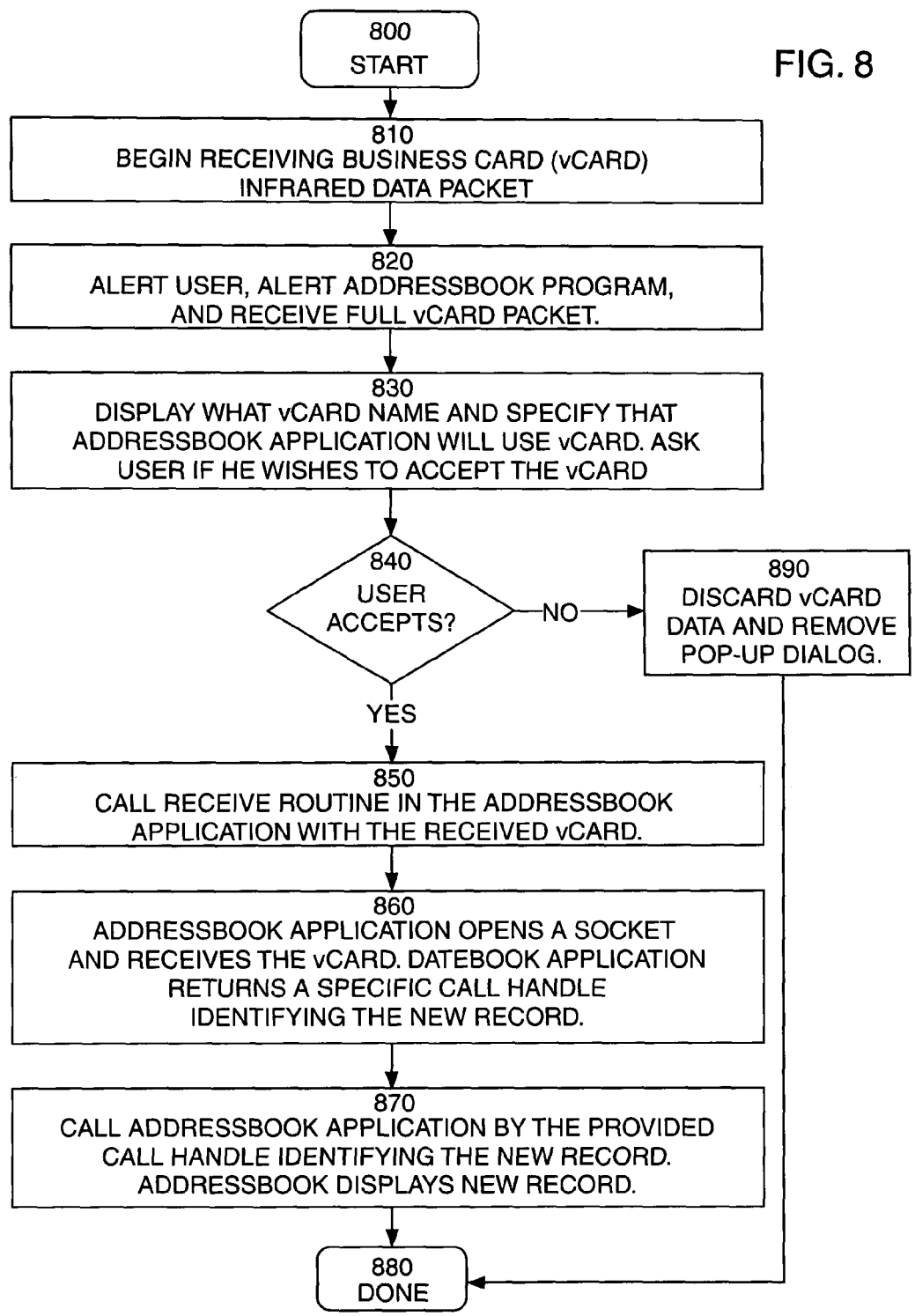
FIG. 8 illustrates a flow diagram that describes how a mobile computing device may receive an electronic business card using the Exchange Manager of the present invention.

To fully describe the business card exchange example, two flow diagrams are presented. FIG. 7 presents a first flow diagram wherein the control flow of a mobile computing device that transmits a business card is presented. FIG. 8 describes the control flow of a mobile computing device that receives an electronic business card.

An Infrared Business Card Sender

FIG. 7 discloses the control flow one possible embodiment of an electronic business card transmitter. The embodiment of FIG. 7 is described with reference to a mobile computing device disclosed in the U.S. patent application entitled "Method and Apparatus For Interacting With A Portable Computer System" filed Jan. 29, 1997 having Ser. No. 08/790,518 which is hereby incorporated by reference. In a mobile device constructed according to the teachings of the that application, a single button press can turn on the mobile computing device and launch a particular application. In the present invention, such a system is used wherein an addressbook button is pressed to launch an addressbook application at step 707 as illustrated in FIG. 6.

At step 714, the addressbook application determines if the addressbook button has been held for a predetermined amount of time such as two seconds. If the button has been released, then the addressbook application proceeds to step 770 where it displays an addressbook record. The addressbook application will continue executing according to the specific implementation of the addressbook program. However, if the addressbook button is held for the predetermined amount of tune, then a business card sending routine is activated at step 721.

The business card sending routine is designed to send an electronic business card via an infrared link to a corresponding receiver application. To promote interactivity, the business card sending routine uses established standards such as the IrDA Infrared communication standards and the vCard (Virtual Business Card) standard from the Internet Mail Consortium. Detailed information about the IrDA infrared standards can be found at the Infrared Data Association web site at http://www.irda.org/. Similarly, detailed information about the vCard data format can be found at the Internet Mail Consortium web site http://www.imc.org/.

The business card sending routine first transmits an "Are you there?" packet that tests to see if there is a nearby receiver to receive an electronic business card. At step 728, the mobile device will monitor for a response.

If there is no nearby infrared transceiver, then the mobile computing device will inform the user there is no nearby infrared device at step 784. It will then proceed to step 756 where the mobile device will return to a mode where it continually listens for infrared packets as specified in the co-pending U.S. patent application entitled "Method and Apparatus for Serial Port Sharing" with Ser. No. 09/078,357 filed on May 13, 1998.

If there is a nearby infrared device, then that device will transmit a response such that the sending device will proceed to step 735. At step 735, the sending mobile computing device transmits the business card. In one embodiment, a business card is transmitted using the vCard format using IrDA infrared transmission standards.

At step 742, the sending mobile device waits for an acknowledgement from the receiving device. If not acknowledgement is received, then the mobile device informs the user that the business card send was not successful at step 777. If an acknowledgement is received, then the user is informed that the business card was sent at step 749. After a successful or successful transmission, the infrared component of the mobile device returns to a passive receive mode at step 756.

An Infrared Business Card Receiver

FIG. 8 discloses the control flow one possible embodiment of an electronic business card receiver. It should be noted that the business card sender and business card receiver should be implemented in the same mobile computing device such that users may both send and receive business card information. The embodiment of FIG. 8 is described with reference to a mobile computing device that has already executed the connection handshake by responding to an "Are you there?" message.

Referring to step 810, the mobile device begins receiving an infrared data packet. By examining the packet headers, the receiver identifies the data packet as a vCard MIME type. Thus, the receiver alerts the user of the packet being received and calls the incoming data callback routine in the addressbook application at step 820. In one embodiment, the addressbook program specifies that it wishes to display the default accept/reject dialogue box. The Exchange Manager then continues to receive the remainder of the data packet.

At step 830, after the entire vCard data packet has been received by the Exchange Manager, the Exchange Manager displays the accept/reject dialogue box. Specifically, the Exchange Manager displays a dialogue box which informs the user that a vCard has been received and that the Addressbook application will receive the data if the user accepts the data. The user enters a response at step 840.

If the user does not want the received vCard information, then the user rejects the vCard and the mobile computing system proceeds to step 890. At step 890, the vCard data is discarded and the pop-up dialogue box is removed from the display.

If the user wishes to keep the received business vCard, then the user accepts the vCard and the mobile computing device proceeds to step 850. At step 850, the Exchange Manager calls a callback routine in the Addressbook application for receiving vCard data. This callback routine was provided to the Exchange Manager when Addressbook registered with the Exchange Manager.

Within the callback routine, at step 860, the Addressbook callback routine opens a socket and receives the vCard data from the Exchange Manager. The Addressbook stores the newly received vCard in its file system. After storing the vCard, the Addressbook callback routine returns a call handle that can be called to activate the Addressbook program and bring the Addressbook into a state where the newly received vCard information is displayed.

At step 870, the Exchange manager then calls the returned call handle. The Addressbook application will activate and display the newly received vCard. Thus, with the teachings of the present invention, the user of the receiving mobile computing device merely accepts the incoming vCard packet and the mobile device automatically receives the vCard, stores the vCard, and displays the vCard.

The foregoing has described a unified method for providing external and interprocess communication in a computer system. It is contemplated that changes and modifications may be made by one of ordinary skill in the art, to the materials and arrangements of elements of the present invention without departing from the scope of the invention.

U.S. application Ser. No. 08/790,518

The following is a veritable copy of sections from U.S. patent application Ser. No. 08/790,518, and in particular, the BACKGROUND OF THE INVENTION and DETAILED DESCRIPTION sections. The drawings to the patent application have been added to the application as well. Reference numbers have been changed in the copy and added drawings so they could be integrated into the application without conflicting with previously used reference numbers.

BACKGROUND OF THE INVENTION FROM SER. NO. 08/790,518

Many busy business professionals require a lot of information while they are traveling. To fill this need, a market for palmtop computer systems has emerged. Palmtop computer systems are small compact computers that can fit in the palm of your hand. Palmtop computer systems are usually used to perform personal informational management tasks such as, an address book, a daily organizer and a to do list.

Users of palmtop computer systems need to be able to access the information stored into the palmtop computer as fast as possible. For example, a person talking on a phone may schedule an appointment with the person on the other end of the phone. Thus, the person would need to access the information in his calendar program on the palmtop computer system as fast as possible such that no interruption of the telephone conversation would be required.

Existing palmtop computer systems often require a number of steps to obtain the desired information. For example, to obtain information from a calendar date, a person may first need to turn on the palmtop computer system. Some systems then require a "boot-up" time before the palmtop computer system enters an operational state. After the palmtop is on and ready, the person must then start the calendar application. Finally, the person must navigate the calendar application to locate the desired date. Although, those few steps may seem simple, such steps seem to be an unnecessary nuisance to a person that wants to quickly access the appropriate information. It would therefore be desirable to implement a palmtop computer system that allows the user to very quickly access the required information.

DETAILED DESCRIPTION FROM SER. NO. 08/790,518

A Portable Computer System With One-Touch Application Buttons

Figure 9:
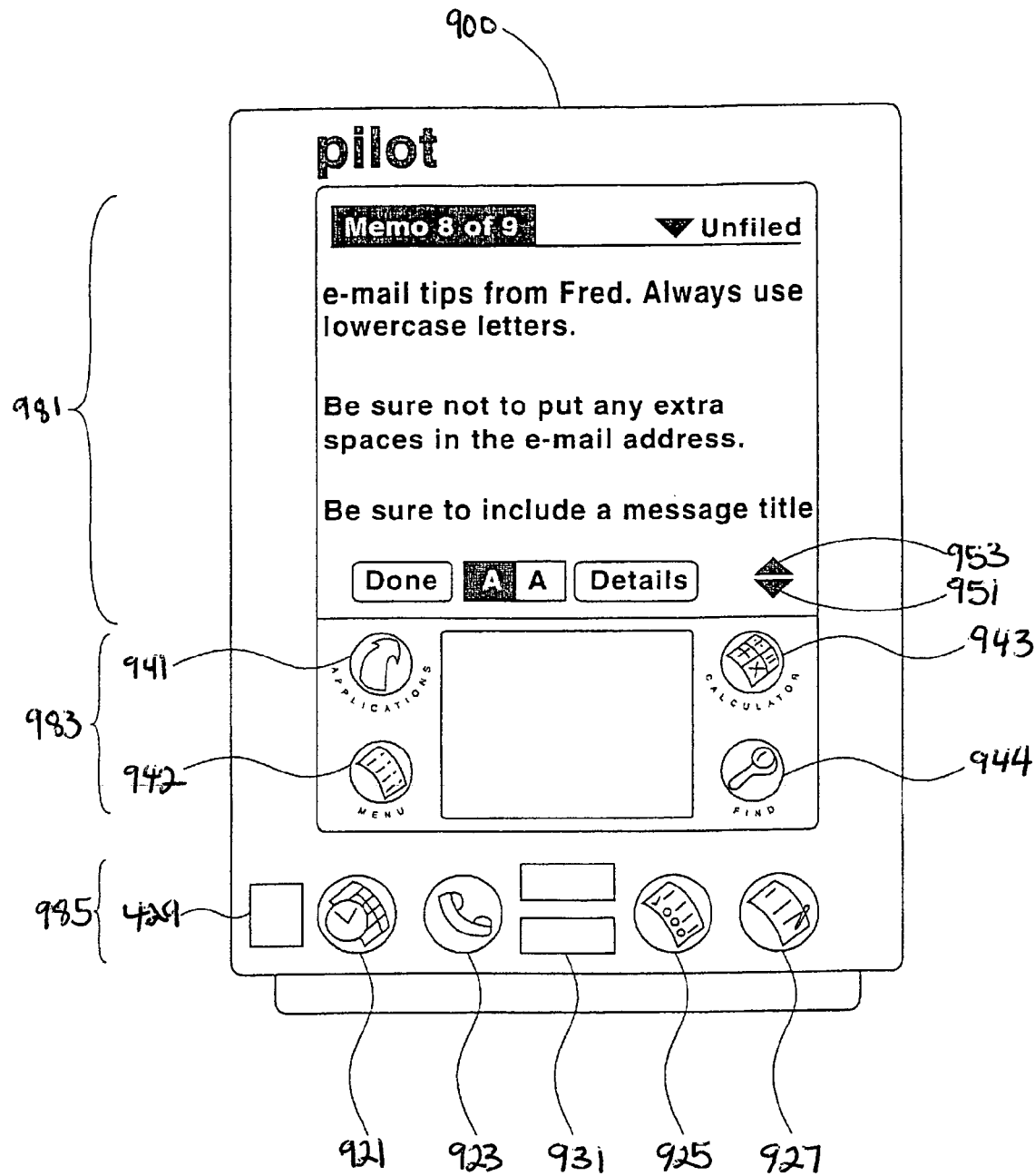
FIG. 9 illustrates a portable computer system with defined application buttons.

FIG. 9 illustrates a one embodiment of a portable computer system 900 constructed according to the teachings of the present invention. Most of the surface area of the portable computer system 900 consists of a screen display area 981. The screen display area 981 is used for displaying information to the user. The screen display area is covered with a touch sensitive digitizer pad that can detect user interaction with a stylus or finger.

Below the display area 981 is a user input area 983. The user input area 983 is used to input text in the Graffiti® writing area 945 and interact with the application buttons 941 through 944. The user input area 983 is covered by the digitizer pad that will sense the users finger or stylus.

Below the user input area 983 is a mechanical button input area 985. In the embodiment of FIG. 9 there are seven different mechanical buttons on the front of the portable computer system: a power button, two directional scrolling buttons, and four different application buttons.

The first mechanical button is a power button 929. If the portable computer system 900 is off, then the power button 929 turns on the portable computer system 900 and brings the portable computer system 900 to the state that the portable computer system 900 was in just before it powered down. Conversely, if the portable computer system is on then pressing the power button 929 will save the current state of the portable computer system 900 and turn the portable computer system 900 off.

A pair of scrolling buttons 931 are used to scroll information in the display area 981 up and down. The scrolling buttons 941 allow a user to view a list of information that does not fit on the display.

There are four mechanical application buttons 921, 923, 925, and 927 illustrated in FIG. 9. In the embodiment of FIG. 9, application button 921 is used for a calendar application, application button 923 is used for an address book application, application button 925 is used for a To-do list application, and application button 927 is used for a note pad application. The embodiment of FIG. 9 provides just one possible set of applications. Other applications could be used instead of the applications illustrated in FIG. 9. Furthermore, the application buttons are programmable such that applications assigned to each application button may be changed.

When the portable computer system 900 is powered-off, the application function buttons 921, 923, 925 and 927 turn on the portable computer system and then begin executing the associated application. For example, if the user presses the addressbook application button 923, the portable computer system will turn on and begin executing the address book application.

In the present embodiment, the application buttons operate by generating a hardware interrupt signal to the processor in the portable computer system 900. The hardware interrupt signal wakes the processor in the portable computer system 900 from a sleep mode and caused the processor to execute code in a wake-up routine. In the wake-up routine, the processor checks a register to determine which application button was pressed. After determining which application button was pressed.

To further convenience the user, each application starts executing by entering a state that has been chosen to best provide the information the user may be seeking. The following table lists the current applications illustrated in FIG. 9 and the initial state that each application enters when the corresponding application button is pressed:

| Application | Description of Initial state. |
|---|---|
| Calendar | Appointment list for the current day. |
| Addressbook | List of names and phone numbers for most recently accessed multi-function category. |
| To-Do | To-Do list of most recently accessed multi-function category. |
| Memo Pad | Current Memo being edited (if any) else current list of memos. |

Thus, each application button turns on the portable computer system 900, starts executing the corresponding application, and brings the corresponding application into an initial state that has been chose to provide the most useful information. In some applications, the initial state can be set by the user such that the user can decide what state the application should enter when the corresponding application button has been pressed.

Multi-Function Categories and Application Button Overloading

Figures 10A, 10B, 10C:
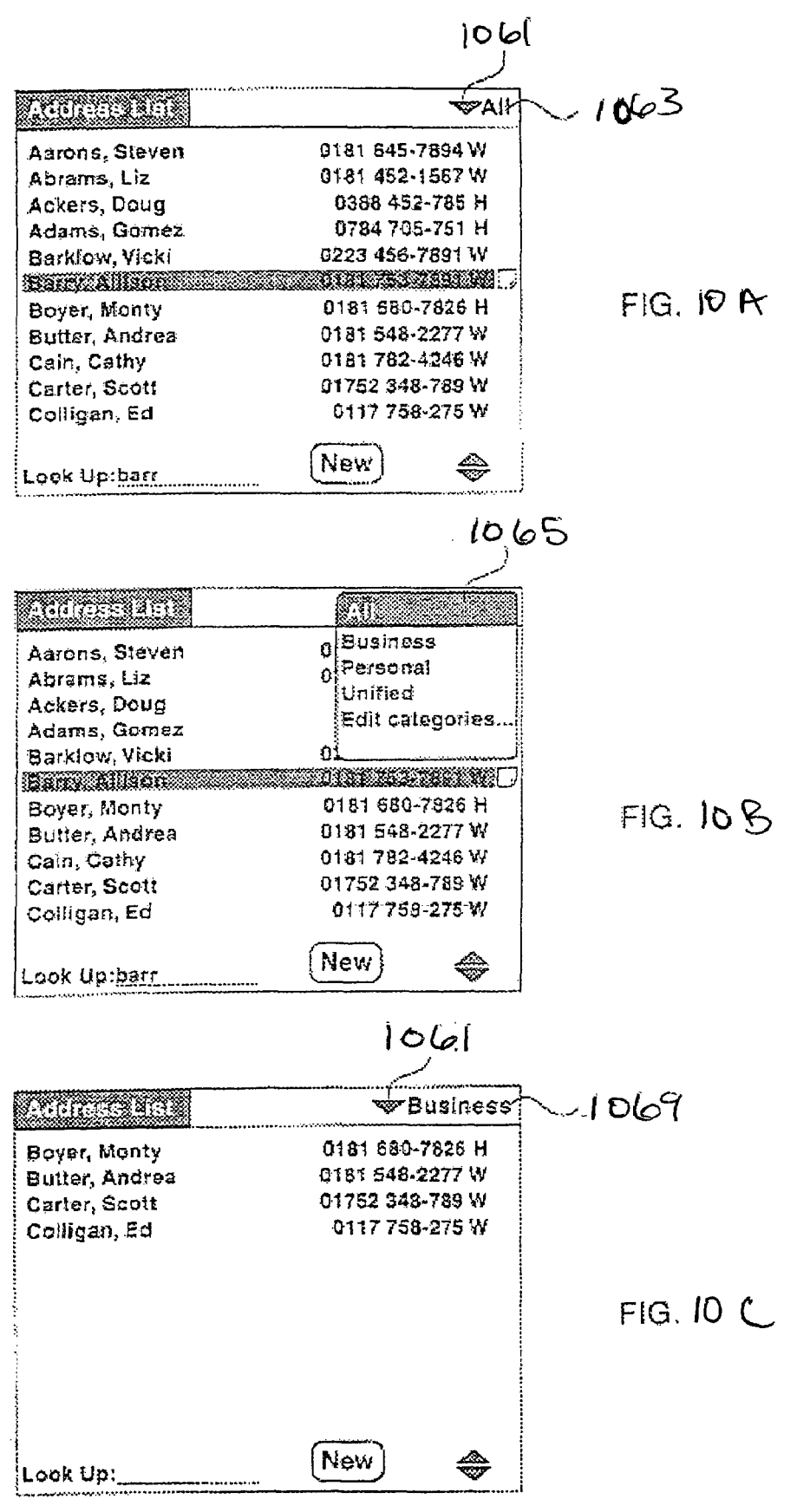

As stated in the previous section, when the addressbook application button 923 is pressed, the portable computer system is turned on and the addressbook application starts executing. FIG. 10A provides an example of how the addressbook application may appear on the screen after the addressbook application button 923 has been pressed. In FIG. 10A there is a list of acquaintances of the user and associated telephone numbers. The user can select a particular acquaintance using a stylus or his finger. In FIG. 10A the acquaintance "Allison Barry" has been selected. If the user touches the selected Allison Barry again, a display screen containing additional information about Allison Barry will be presented.

Referring to the upper right corner of the addressbook screen display in FIG. 10A, there is a multifunction category name 1063. In FIG. 10A, the multifunction category that is currently displayed is the "all" category. Each addressbook record is assigned to a particular multifunction category. By assigning each addressbook record to a multifunction category, certain acquaintances can be grouped together. For example, one multifunction category may be "personal" and that category would include close personal friends of the user. Another multifunction category may be "business" and that category would include business acquaintances of the user. The "all" displays all the addressbook records from all multifunction categories.

Next to the multifunction category name 1063 is a multifunction category edit indicator 1061. The multifunction category edit indicator 1061 indicates that the user can select a particular multifunction category to display by selecting the multifunction category edit indicator 1061. For example, FIG. 10B illustrates how the screen would appear after the user selects the multifunction category edit indicator 1061. In FIG. 10B a list of the available multifunction categories is displayed. In the example of FIG. 10B, the available multifunction categories are "all" categories, "business" acquaintances, "personal" acquaintances and "unfiled" acquaintances. Furthermore, the user can add additional multifunction categories or edit the existing multifunction categories by selecting the "Edit categories . . . " list item from the pop-up menu.

An easier method of switching between the different multifunction categories exists. Specifically, the user can select between the various multifunction categories in the addressbook by continuing to press the addressbook application button after the addressbook application is executing. For example, referring to the addressbook display of FIG. 10A if the user again presses the addressbook application button 923, the address book application will move on to the multifunction category, the business category, as illustrated in FIG. 10C. By successively pressing the address book application button 923 the user can scroll through all the different multifunction categories. Alternatively, the user may continuously hold down the addressbook application button 923 and the addressbook application will slowly scroll through the different multifunction categories.

Different applications can perform different actions when their respective application button is pressed when the application is already running. Thus, each application button is "overloaded" in that the function that the key performs depends on the current context. The following table describes how each application behaves when the associated application button is pressed when the application is already running:

| Application | Effect of pressing the Application button when the application is already running. |
|---|---|
| Calendar | Scroll through appointment list for the current day. (Scroll keys move to different days.) |
| Addressbook | Rotate through the different multifunction categories. |
| To-Do | Rotate through the different multifunction categories. |
| Memo Pad | Rotate through the different multifunction categories. |

In summary, each application button turns on the portable computer system 900 and begins executing the associated application if the portable computer system is off. If a different application is running when an application button is pressed, the application associated with the pressed application button begins executing. However, if the application is already up and running and the application button for that application is pressed then the application can perform a specific function such as rotating through different multifunction categories as described in the example of FIGS. 10A and 10C.

Externally Accessible Application Signals

Figure 11:
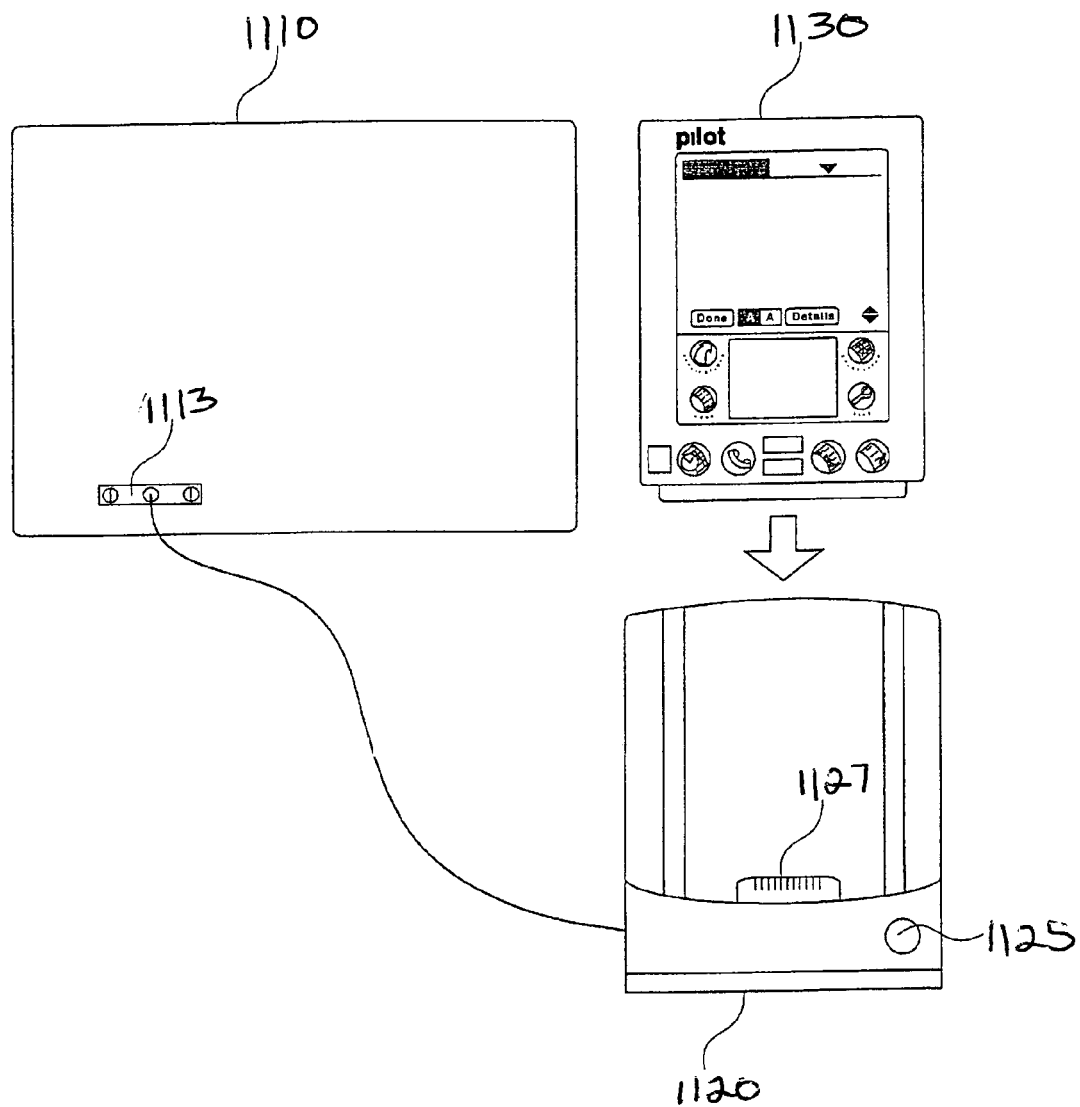
FIG. 11 illustrates a portable computer system and a personal computer system equipped with a cradle for synchronizing with the portable computer system.

FIG. 11 illustrates a portable computer system 1130. The portable computer system 1130 may execute a number of different application programs. However, the most common applications on the portable computer system 1130 will consist of a suite of Personal Information Management (PIM) applications such as the addressbook application, the calendar application, the To-Do list application, and the memo pad application previously described. Most people that use a portable computer system 1130, also have a personal computer system that has the same or similar applications. It would therefore be desirable to synchronize information between the portable computer system 1130 and the personal computer system. This would allow the user to edit the information while using the desktop personal computer system at an office and edit the same information when using the portable computer system while traveling.

Referring again to FIG. 11, a desktop personal computer system 1110 is also illustrated. Coupled to the serial port 1113 of the desktop personal computer system 1110 is a communication cradle 1120. The communication cradle 1120 is used to provide a serial communication link between the portable computer system 1130 and the personal computer system 1110. Specifically, the serial communication lines from the serial port 1113 are extended and terminate at a serial interface connector 1127 on the communication cradle 1120. A matching serial interface connector (not shown) on the rear of the portable computer system 1130 connects the portable computer system 1130 to the personal computer system 1110.

To synchronize the information on the portable computer system 1130 with the information on the personal computer system 1110, a user drops the portable computer system 1130 into the communication cradle 1120 and presses a synchronization button 1125 on the communication cradle 1120. The synchronization button 1125 causes a synchronization program on the portable computer system 1130 to execute. The synchronization program on the portable computer system 1130 wakes up a peer synchronization program on the personal computer system 1110. The synchronization program on the portable computer system 1130 and the peer synchronization program on the personal computer system 1110 perform the necessary operations to synchronize information stored on the two computer systems. The architecture of the synchronization process is described in the U.S. patent application entitled "Extendible Method and Apparatus for Synchronizing Multiple Files On Two Different Computer Systems" with Ser. No. 08/542,055, filed on Oct. 93, 1995.

The synchronization button 1125 on the communication cradle 1120 operates similar to the application buttons on the personal computer system 1110. Specifically, the synchronization button 1125 on the communication cradle 1120 asserts a hardware interrupt signal to the processor in the personal computer system 1110. The interrupt routine determines that the synchronization button 1125 was pressed and thus starts executing the synchronization program on the portable computer system 1130. Thus, the synchronization button 1125 uses an externally accessible version of the application buttons.

Figure 12:
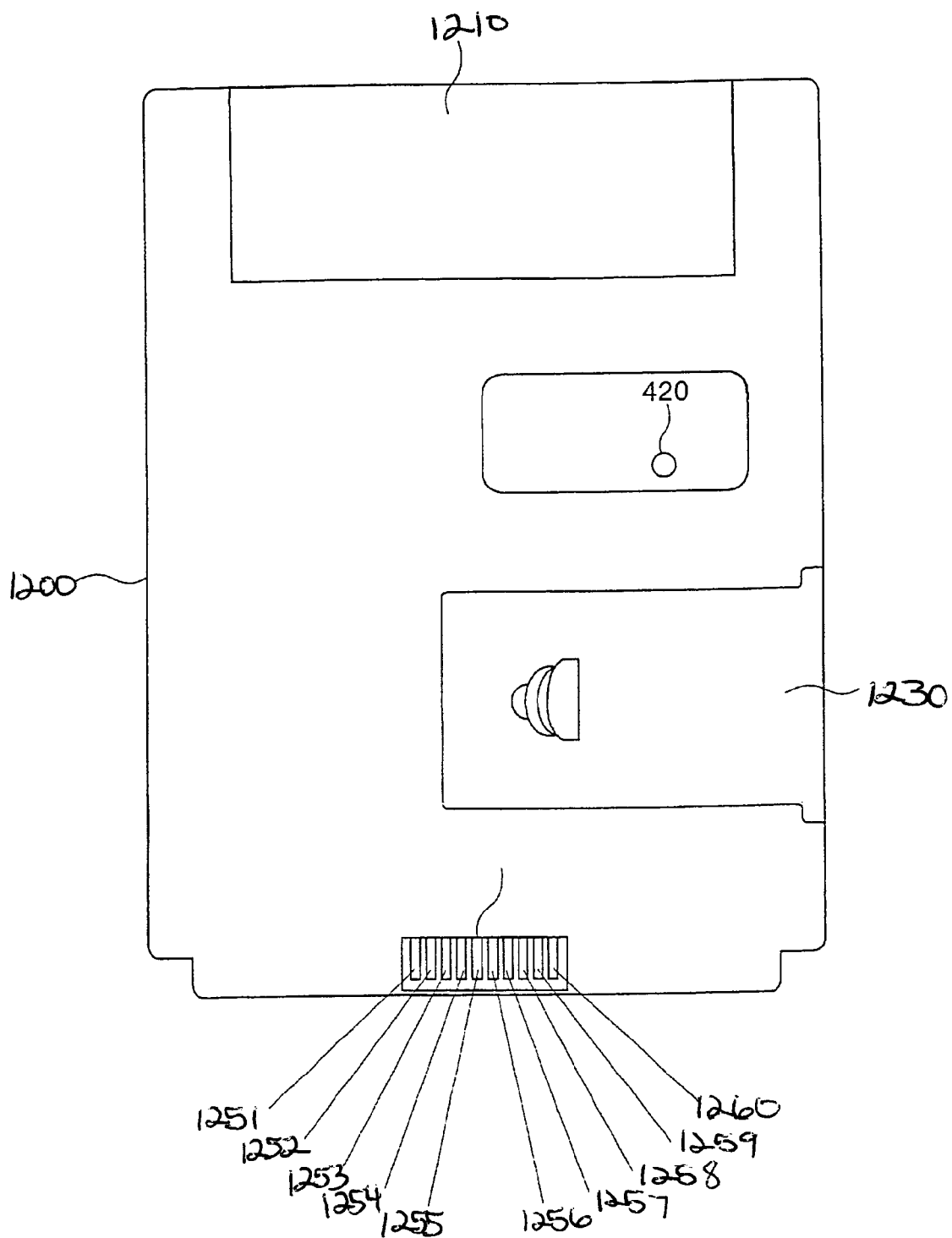
FIG. 12 illustrates the rear of a portable computer system with an interface for communicating with the synchronization cradle of FIG. 11.

FIG. 12 illustrates the rear panel of a portable computer system 1200 for use in the communication cradle 1120. Referring to the bottom of portable computer system 1200, a set of printed circuit board interface connectors 1251 though 1260 are illustrated. The printed circuit board interface connectors connect with a corresponding interface on the communication cradle 1120. The following table lists the printed circuit board interface connectors in one embodiment of the portable computer system 1200:

| Ref.# | Description |
|---|---|
| 451 | Data Terminal Ready (DTR) [output] |
| 452 | Power output [output] |
| 453 | Serial Data Input (RXD) [input] |
| 454 | Ready To Send (RTS) [output] |
| 455 | Serial Data Output (TXD) [output] |
| 456 | Clear To Send (CTS) [input] |
| 457 | Hardware Interrupt Line [input] |
| 458 | General purpose data input [input] |
| 459 | Unused |
| 460 | Electrical Ground |

To assert a hardware interrupt signal to the processor in the portable computer system 1200, the synchronization button 1125 on the communication cradle 1120 only needs to complete an electrical circuit between the power output connector 1252 and the hardware interrupt line 1257. The hardware interrupt line 1257 is different from the hardware interrupt line used by the application buttons.

Figure 13:
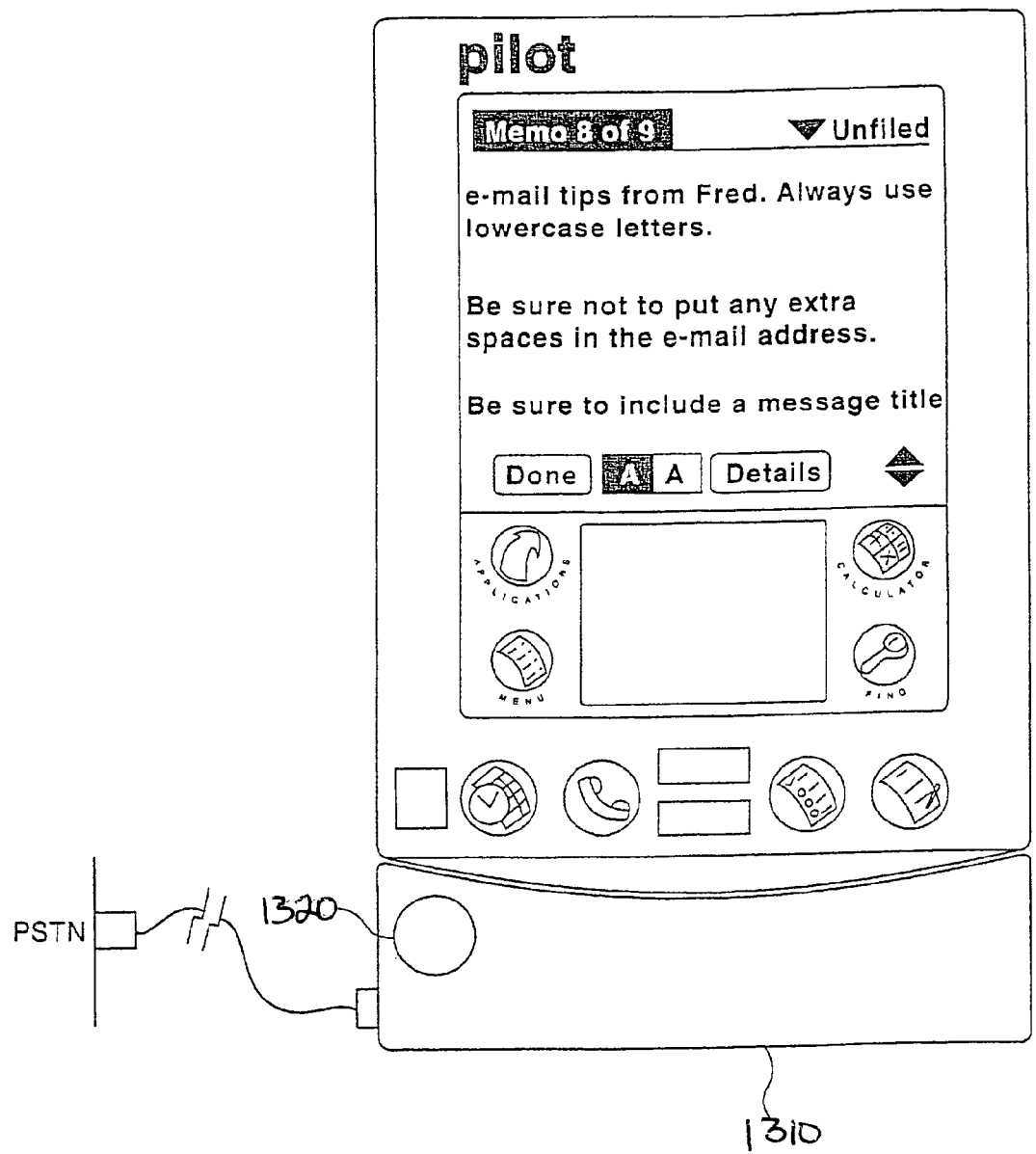
FIG. 13 illustrates a portable computer system equipped with a small modem for remotely synchronizing with a personal computer system.

The hardware interrupt line 1257 can be used to perform other operations as well. FIG. 13 illustrates a portable computer system coupled to a clip-on modem 1310. The clip-on modem 1310 includes a remote synchronization button 1320 for remotely synchronizing with a companion personal computer. Since a remote synchronization through the clip-on modem 1310 is very different than a local synchronization through a communication cradle 1120, the remote synchronization button 1320 needs to execute a different synchronization program or execute the same synchronization program with different input parameters.

To handle the remote synchronization, the remote synchronization button 1320 can be wired to assert both the hardware interrupt line 1257 and the General purpose data input 1258. In such an embodiment, the interrupt service routine that handles a hardware interrupt associated with the hardware interrupt line 1257 would first check the General purpose data input 1258. If the General purpose data input 1258 is not asserted, then a standard synchronization through the communication cradle 1120 would be performed. However, if the General purpose data input 1258 is asserted, then a special synchronization routine for handling remote synchronizations would be performed.

Although the present invention has been described in terms of specific exemplary embodiments, it will be appreciated that various modifications and alterations might be made by those skilled in the art without departing from the spirit and scope of the invention as set forth in the following claims.

The invention claimed is:

1. A software product storing code for providing data communications in a computer system, wherein execution of the code by one or more processors causes the one or more processors to perform the steps of:

an unified exchange manager accepting message information;

the unified exchange manager selecting an appropriate application from a plurality of applications that are executable on the computer system, the unified exchange manager selecting the appropriate application based on a data type of the message information, wherein said unified exchange manager communicates with a plurality of communication libraries, each said communication library implementing a particular protocol for external communication, wherein at least one of said communication libraries comprises a wireless communication library;

determining whether a user accepts said message information; and passing said message information from said unified exchange manager to the appropriate application program in response to said user accepting said message information.

2. The software product of claim 1, said steps further comprising:

alerting said appropriate application that said appropriate application will be receiving said message information.

3. The software product of claim 1, wherein said message information is from an external source.

4. The software product of claim 1, wherein said message information is from a second application program.

5. The software product of claim 1, said steps further comprising:

returning from said appropriate application program a call handle that activates said application program and displays said message information.

6. The software product as claimed in claim 1, wherein the at least one wireless communication library comprises an infrared communication library.

7. The software product as claimed in claim 6, wherein said infrared communication library implements an IrDA protocol.

8. The software product as claimed in claim 1, wherein one of said communication libraries comprises a pager communication library.

* * * * *